United States Patent
Nilsson et al.

(10) Patent No.: US 11,973,544 B2
(45) Date of Patent: Apr. 30, 2024

(54) CHASE COMBINING IN A DISTRIBUTED WIRELESS SYSTEM

(71) Applicant: Telefonaktiebolaget LM Ericsson (publ), Stockholm (SE)

(72) Inventors: Magnus Nilsson, Lund (SE); Martin Isberg, Lund (SE); Jan Celander, Malmö (SE); Magnus Sandgren, Staffanstorp (SE); Peter Jakobsson, Lund (SE); Torsten Carlsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 17/920,120

(22) PCT Filed: Apr. 24, 2020

(86) PCT No.: PCT/EP2020/061524
§ 371 (c)(1),
(2) Date: Oct. 20, 2022

(87) PCT Pub. No.: WO2021/213678
PCT Pub. Date: Oct. 28, 2021

(65) Prior Publication Data
US 2023/0163809 A1   May 25, 2023

(51) Int. Cl.
*H04B 7/024* (2017.01)
*H04L 1/00* (2006.01)

(52) U.S. Cl.
CPC ......... *H04B 7/024* (2013.01); *H04L 1/0045* (2013.01)

(58) Field of Classification Search
CPC ................................ H04B 7/02; H04L 1/0045
See application file for complete search history.

(56) References Cited

U.S. PATENT DOCUMENTS

| | | | |
|---|---|---|---|
| 2002/0141513 A1* | 10/2002 | England | H04B 7/12 455/132 |
| 2007/0168988 A1* | 7/2007 | Eisner | G06F 9/44589 717/124 |
| 2011/0263271 A1 | 10/2011 | Hoymann et al. | |

OTHER PUBLICATIONS

Interdonato, Giovanni, "Signal Processing Aspects of Cell-Free Massive MIMO", Linköping Studies in Science and Technology Licentiate Thesis No. 1817, Licentiate Thesis, Linkoping University, Sep. 21, 2018, 49 pages.

* cited by examiner

*Primary Examiner* — Sung S Ahn
(74) *Attorney, Agent, or Firm* — Murph,y Bilak & Homiller, PLLC

(57) ABSTRACT

A wireless system comprises a controlling node and multiple antenna processing nodes coupled to the controlling node but separated from each other. The controlling node receives (720) first soft bit information from a first antenna processing node, the first soft bit information corresponding to reception of a wireless transmission. Responsive to determining that it cannot decode transmitted bits using the first soft bit information, the controlling node requests (730) and receives (740) second soft bit information from a second antenna processing node, the second soft bit information also corresponding to the first wireless transmission from the wireless device and having been buffered by the second antenna processing node. The controlling node decodes (750) bits from the first wireless transmission using both the first and second soft bit information. The controlling node may then signal the antenna processing nodes that they can discard buffered information for the wireless transmission.

20 Claims, 8 Drawing Sheets

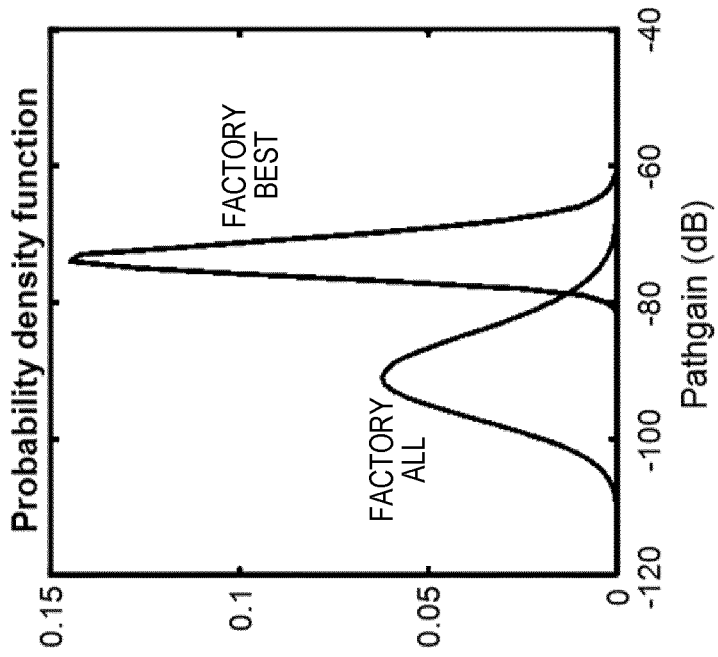
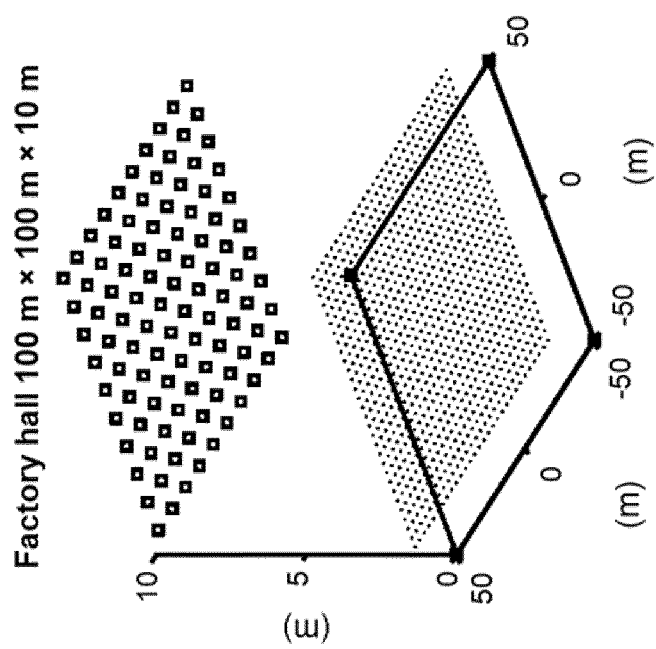
FIG. 5

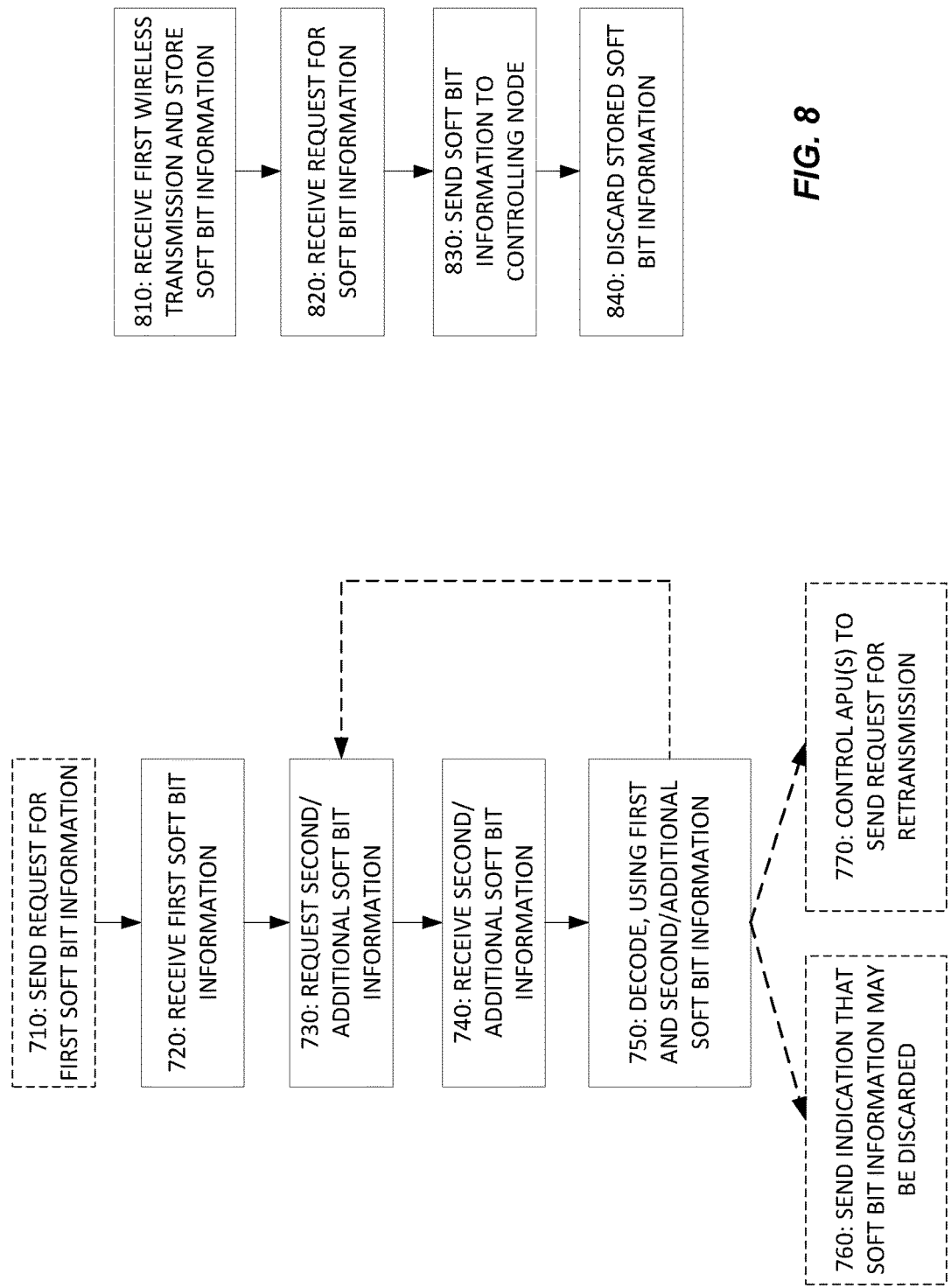

CHASE COMBINING IN A DISTRIBUTED WIRELESS SYSTEM

BACKGROUND

The term "cell-free massive MIMO" has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point," "antenna processing node," or "antenna processing unit." These terms may be understood to be interchangeable for the purposes of the present disclosure, with the abbreviation "APU" being used herein. These APUs are communicatively coupled to and controlled by a controlling node, which is spatially separate from some or all of the APUs, may be referred to interchangeably as a "central processing node" or "central processing unit"—the abbreviation "CPU" is used herein.

FIG. 1 provides a conceptual view of a cell-free massive MIMO deployment, comprising a CPU 20 connected to several APUs 22, via serial links 10. As seen in the figure, each of several user equipments (UEs) 115 may be surrounded by one or several serving APUs 22, all of which may be attached to the same CPU 20, which is responsible for processing the data received from and transmitted by each APU. Each UE 115 may thus move around within this system without experiencing cell boundaries.

Systems described herein include at least CPU and two or more APUs spatially separated from each other and from the CPU. These systems, which may be considered examples of cell-free massive MIMO deployments, will be called distributed wireless systems herein. FIGS. 2 and 3 provide other views of example deployments of distributed wireless systems. In this scenario shown in FIG. 2, multiple APUs 22 are deployed around the perimeter of a room, which might be a manufacturing floor or a conference room, for example. Each APU 22 is connected to the CPU 20 via a "strip," or "stripe." More particularly, the CPU 20 in this example deployment is connected to two such stripes, each stripe comprising a serial concatenation of several (10, in the illustrated example) APUs 22. FIG. 3 shows an two-dimensional model of a factory floor with densely populated APUs 22 connected to the CPU 20 via several such "stripes" As a general matter, the CPU 20 can target a UE anywhere in the room by controlling one or several APUs 22 that are closest to the UE to transmit signals to and receive signals from the UE. In this example deployment, the APUs are spaced at 10 meters, in both x- and y-directions, which means that a UE is never more than about 7 meters away from one (or several) APUs, in the horizontal dimension.

It will be appreciated that the distribution of base station antennas into APUs as shown in FIGS. 1-3 can provide for shorter distances between the base station antennas and the antenna(s) for any given UE served by the base station, in many scenarios. This will be an enabler for the use of higher carrier frequencies, and thereby higher modulation/information bandwidths, both of which are key expectations for fifth-generation (5G) wireless networks.

Another requirement of 5G networks is that they support a high quality-of-service (QoS). To achieve this, it is necessary that the radio link between the mobile/device/machine (UE) and the base station be highly reliable and support low-latency communications. This is especially the case for industrial scenarios, for example, where mission-critical real-time communication is needed for communications with or between machines equipped with devices.

In conventional wireless systems, if a transmission from a wireless device to a base station cannot be decoded by the base station, the problem is typically resolved by the base station asking the wireless device to transmit the information again. The new transmission can be done with new coding, or with the same coding used for the first transmission. However, this increases the latency of communications. Further, in a distributed wireless system using serial links between a CPU and multiple APUs, retransmissions can increase the data load on these serial links, which might be referred to as the "fronthaul" network when discussing such systems.

SUMMARY

The present disclosure describes techniques for reducing the need for retransmissions by a wireless device when operating in a distributed wireless system like those generally described above. In a system with series connected APUs, soft bits for an uplink wireless transmission as received by two or several APUs are combined in the CPU, using maximum-ratio combining. However, the soft bits from the second APU (and further APUs) are only requested and sent over the link when needed. By dynamically scaling from using all available uplink soft bits, when performing coherent addition, to using data from only one APU, when signal conditions are good, the system can provide both high sensitivity as well as low power consumption and reduced capacity requirements for the serial interfaces.

An example method, according to some embodiments, is carried out in a controlling node of a distributed wireless system that comprises the controlling node and two or more antenna processing nodes communicatively coupled to the controlling node but spatially separated from each other and from the controlling node. This example method comprises receiving first soft bit information from a first one of the antenna processing nodes, the first soft bit information corresponding to reception of a first wireless transmission from a wireless device at the first one of the antenna processing nodes. The method further comprises, in response to a determination that the controlling node is unable to successfully decode transmitted bits from the first wireless transmission using the first soft bit information, requesting soft bit information from a second one of the antenna processing nodes. The method further includes receiving second soft bit information from the second one of the antenna processing nodes, the second soft bit information corresponding to reception of the first wireless transmission from the wireless device at the second one of the antenna processing nodes, and decoding transmitted bits from the first wireless transmission using both the first soft bit information and the second soft bit information. Additional soft bit information may be requested and used in the decoding, as needed, in some embodiments.

Another example method, according to some embodiments, is carried out in an antenna processing node of a distributed wireless system that comprises a controlling node, the antenna processing node, and one or more additional antenna processing nodes, where each of the antenna processing nodes are communicatively coupled to the controlling node but are spatially separated from each other and from the controlling node. This example method comprises receiving a first wireless transmission from a wireless device and storing first soft bit information corresponding to the first wireless transmission. The method further comprises receiving, from the controlling node, a request for soft bit information corresponding to the first wireless transmission, and sending the first soft bit information to the controlling node, in response to the request.

Details and variants of the methods summarized above are provided below. Further, controlling node apparatuses and antenna processing node apparatuses configured to carry out the methods summarized above and variants thereof are described in the detailed description below, and illustrated in the attached figures.

BRIEF DESCRIPTION OF THE FIGURES

FIG. 5 illustrates a simulation of a factory floor deployment of a distributed wireless system.

FIG. 7 is a process flow diagram illustrating an example method carried out by a controlling node, according to some embodiments.

FIG. 8 is a process flow diagram of an example method carried out by an antenna processing node, according to some embodiments.

DETAILED DESCRIPTION

There are several possible approaches for implementing the interconnections between the CPU in a distributed wireless system and the APUs that it controls. One approach is to implement the interconnections between the CPUs and the APUs as a high-speed digital interface, e.g., such as a high-speed Ethernet connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are downconverted in the APU and converted to digital form before being sent over the digital link to the CPU, for further processing.

Figure 1:
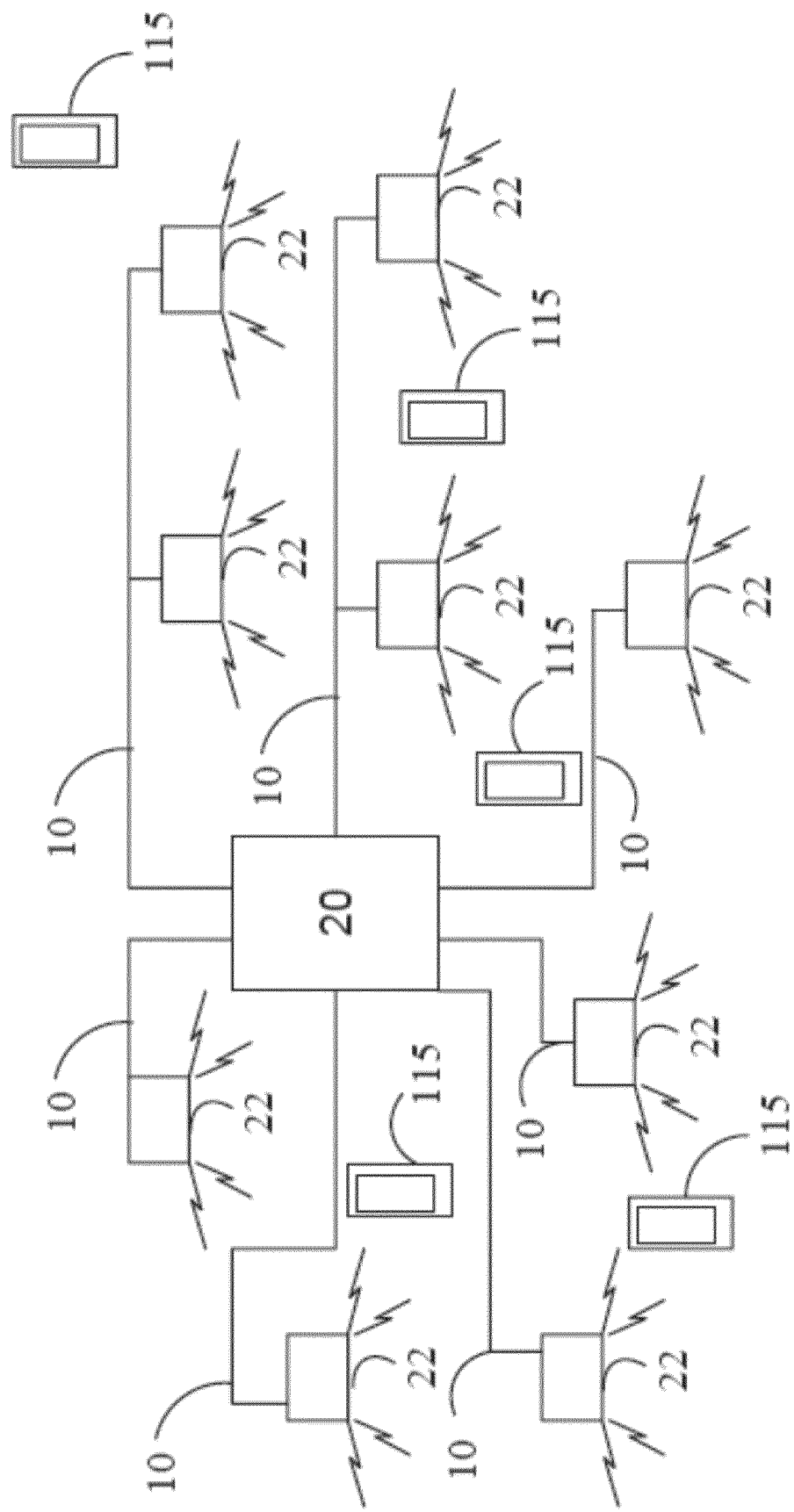
FIG. 1 is an illustration of an example cell-free massive MIMO system.
Figure 2:
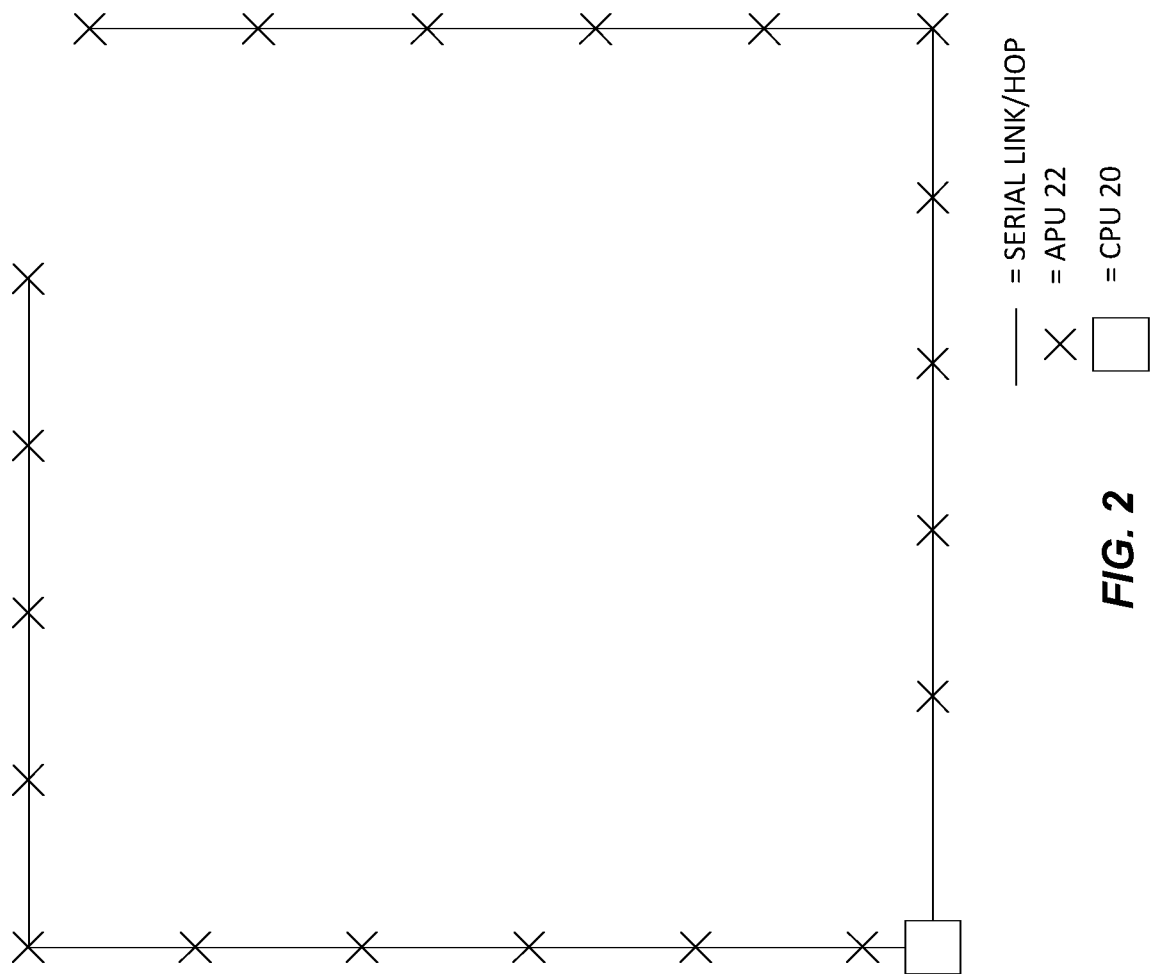
FIG. 2 illustrates an example deployment of a distributed wireless system.
Figure 3:
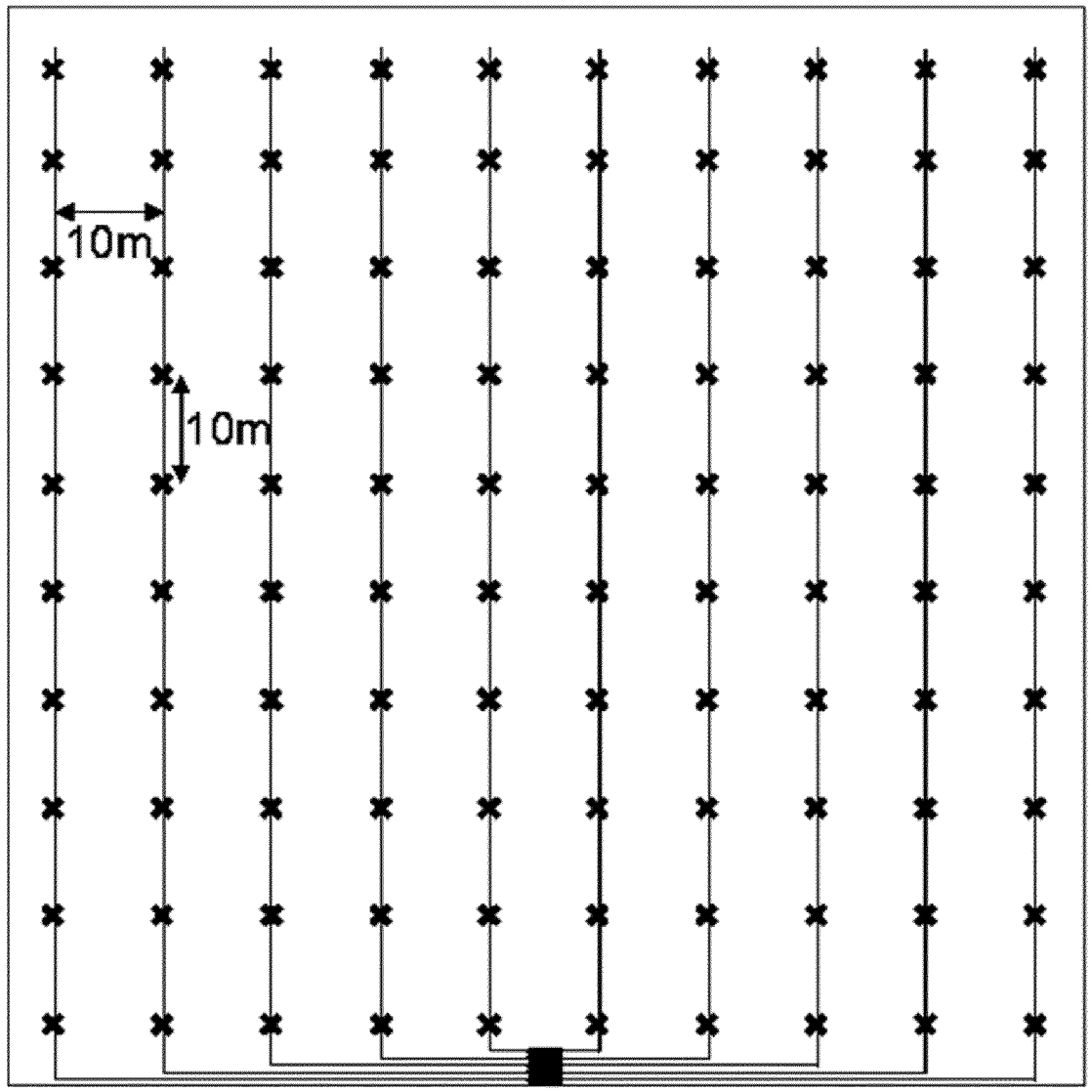
FIG. 3 illustrates another example deployment of a distributed wireless system.
Figure 4:
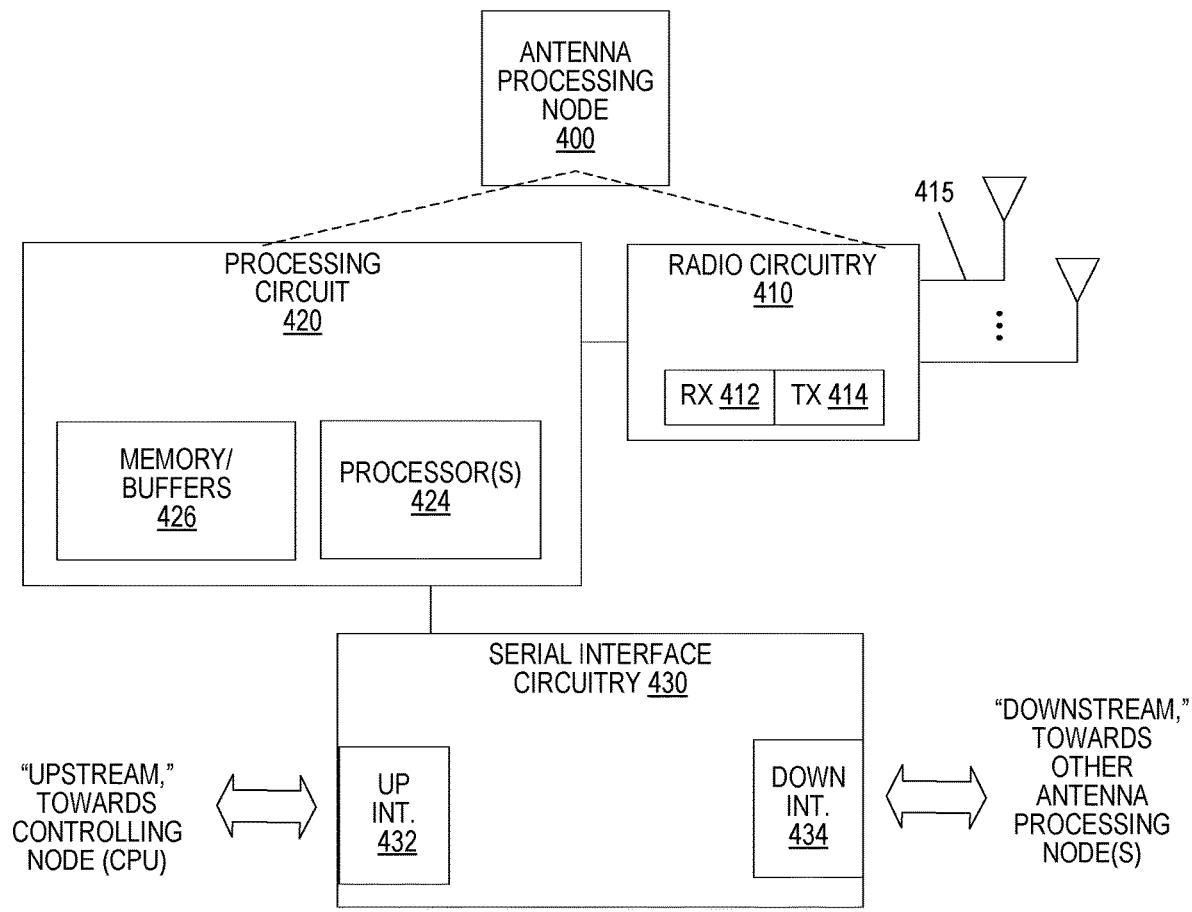
FIG. 4 is a block diagram of an example antenna processing node, according to some embodiments.

In such a system, communications along these serial links may be described as "upstream" and "downstream" communications, where upstream communications are communications in the direction towards the CPU while downstream communications are in the opposite direction, i.e., away from the CPU. In the upstream direction, each APU thus sends its own data towards the CPU, via an upstream serial interface, along with any data that it receives from one or more APUs that are further downstream, via a downstream serial interface. This is seen in FIG. 4, which is a block diagram illustrating components of an example APU, here illustrated as antenna processing node apparatus 400. As seen in the figure, the antenna processing node apparatus 400, which may also be referred to as simply antenna processing node 400, or APU 400, or antenna processing unit 400, also receives communications for itself and for downstream APUs from the CPU, via the upstream serial interface 432, and forwards those communications intended for downstream APUs towards those APUs, via the downstream serial interface 434.

The required capacity of the fronthaul network formed by these serial links is proportional to the number of simultaneous data streams that the APUs in the series can spatially multiplex, at maximum network load. The required capacity of the backhaul of the CPU (i.e., the CPUs connection towards the core network) is the sum of the data streams that the serial links connecting the APUs to the CPUs will transmit and receive at maximum network node. The most straightforward way to limit these capacity requirements is to constrain the number the number of UEs that can be served per APU and CPU. Put another way, the capacity of the distributed wireless system to serve UEs may be limited by the maximum capacities of the serial links between the APUs to the CPUs.

The use of serial interfaces as described above is a good match for downlink (DL) communications, i.e., communications from a base station to one or more UEs. Note that the terms "wireless device," "user equipment," and "UEs" are used herein to refer to any wireless devices served by the distributed wireless systems described here, including wireless devices that do not have a "user" as such but that are connected to machines. The serial interfaces described here work well for downlink communications because the same information is sent to all of the APUs involved in any given transmission to a wireless device. This downlink information may be the bits or data blocks that must be transmitted by the APUs, with each APU involved in the transmission separately performing its own modulation, upconversion, and transmission. When the CPU sends this downlink information to two or more APUs in the chain, it need only send one copy, with each APU forwarding the information further downstream, as necessary.

On the other hand, for uplink (UL) communications, i.e., communications from the UEs to the base station, information from each APU is unique. Further, it is desirable for each APU involved in receiving a transmission from a given UE to send the CPU so-called "soft" information, or "soft bits" obtained by demodulating the receiving transmission, so as to allow the CPU to combine the soft bits from two or more APUs for decoding, when necessary, to compensate for poor signal conditions between a UE and one or several of the APUs. These "soft bits," which may be in the form of in-phase (I) and quadrature (Q) samples of the signal as demodulated at the APU, require more data bits to be conveyed on the serial link than a simple relaying of demodulated user data would. Thus, up to four times the information bandwidth is needed to send the soft bits. This, coupled with the fact that the soft bits are unique for each APU, puts high demands on upstream capacity for the serial links, especially for the link between the CPU and the first downstream APU. It also increases power consumption of the APUs, to support the high data rates transmitted over the serial links.

However, in many deployments of distributed wireless systems, it will likely be the case that the majority of the time, the signal received from a wireless device by at least one of the APUs is of sufficient quality (i.e., subjected to a sufficiently low path loss) that the UL data from the wireless device can be decoded without error from the soft bits obtained by a single APU. This is illustrated in FIG. 5, which shows a simulation of path loss from each of several APUs to a UE at each of the positions represented by dots at the lower portion of the left-hand part of the figure. The right-hand portion of the figure shows a probability density function for the path-gains of links from all APUs to all UE positions outlined, as well as a probability density function for the path-gain of the link from the best APU to each UE position. According to this simulation, selecting the APU with the lowest pathloss, which can be done by the CPU based on signal quality measurements reported to the CPU from the APUs, results in a nearly 100% probability that the pathloss to that APU is equal to the free space pathloss.

But, for applications where ultra-high reliability is necessary, "nearly 100% probability" is not enough. Further, the signal conditions between a UE and a given APU may change over time, e.g., when an object or person moves around the environment, blocking the signal from the APU, meaning that the most recently received signal quality reports may not always be accurate, which means that if the CPU obtains the soft bits from what it believes to be the "best" APU, these soft bits may not always be sufficient to yield a successful decoding of the uplink transmission from the UE.

Embodiments of the presently disclosed methods and apparatuses address these issues. According to these embodiments, in those cases where the CPU is unable to successfully decode a UE's uplink transmission using the soft information/data obtained from a single one of the APUs, the CPU can request soft data from a "second best" APU, and combine that soft information with the soft information received from the second best APU for a second attempt at decoding the uplink transmission. This can be repeated until the CPU has obtained enough soft information to successfully decode the uplink transmission, or until the CPU runs out of APUs to request the data from, in which case the CPU may request that the UE repeat its transmission.

It will be appreciated that this approach requires APUs to buffer, or store, the soft bits demodulated from a given transmission for a period of time, e.g., until they have provided the soft bit information to the CPU in response to a request or until they have been instructed to discard the information. However, this approach also means that soft bit information for a given transmission is only sent to the CPU by multiple APUs in those relatively few events where the extra soft bit information is needed. This can sharply reduce the upstream capacity requirements for the serial links connecting the APUs to the CPUs.

Figure 6:
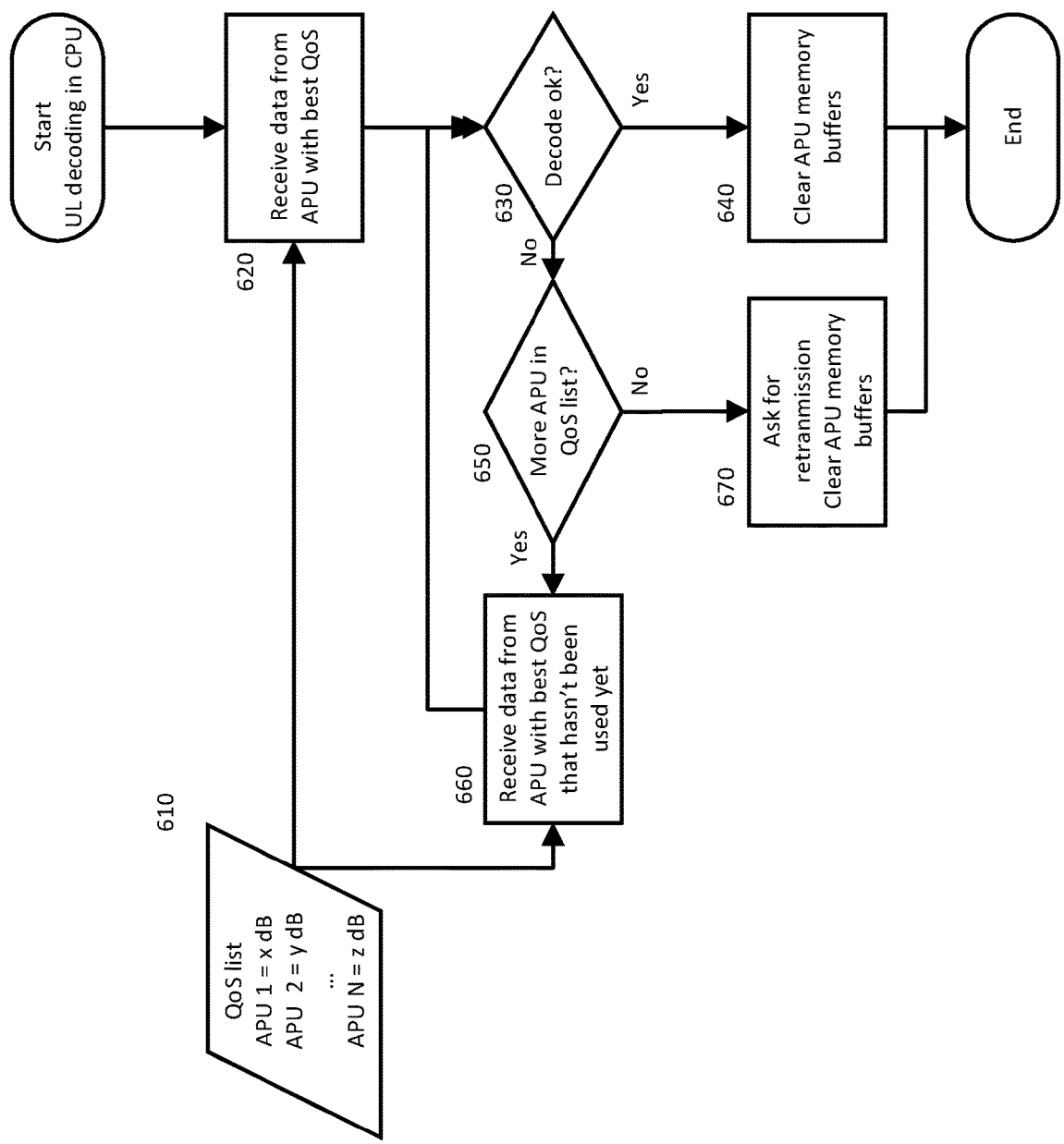
FIG. 6 is a process flow diagram illustrating an example technique, according to some embodiments.

FIG. 6 is a process flow diagram illustrating an example method, according to the technique described in general terms, above. The illustrated method begins with the CPU having an ordered list of measured signal quality or estimated path losses associated with a wireless device of interest. This list is shown at block 610, where it is labeled a "QoS list" and where there is a signal quality (or path loss) value for each of N APUs. For the purposes of this discussion, it is assumed that the quantity associated with APU 1 represents the "best" quantity, in that it is the highest signal quality or the lowest estimated pathloss from among the APUs. In the figure, this best quantity is referred to as the "best QoS." In the illustrated example, it is assumed that APU 2 has the second best QoS; APU 3 has the third best QoS, and so on.

As shown at block 620, the actions taken by the CPU begin with the CPU receiving, from the APU with the best QoS, soft information for a given uplink transmission from a UE. In the illustrated example, this first soft information is received from AU 1. This may be in response to an explicit request sent from the CPU to APU 1, in some embodiments. In others, this soft information may be automatically sent by APU 1 because it was previously informed by the CPU that it has the best QoS for that UE, in which case an explicit request may not be needed.

As shown at block 630, the CPU then determines whether it is able to successfully decode the uplink transmission from the UE, based on the soft information that it has received from the APU 1. If so, then the CPU informs the APUs that they may clear their buffers for that uplink transmission, as shown at block 640, and the process ends with respect to that uplink transmission.

The more interesting case, however, with respect to the inventive techniques described herein, is when the CPU is not able to successfully decode the uplink transmission based on the soft information that it has received from the APU 1. In that case, the CPU determines whether there is another APU in the QoS list, i.e., another APU that has soft information for the uplink transmission, as shown at block 650. If so, then the CPU requests and receives soft bit information from the APU having the next best QoS, i.e., the soft information from the APU having the best QoS among the APUs that have not yet sent their soft information to the CPU. This is shown at block 660. In the illustrated example, this second soft information is requested and received from APU 2.

The CPU then attempts again to decode the uplink transmission, this time using the first and second soft information, i.e., the information from both APU 1 and APU 2. This is done in a manner similar to Chase combining, e.g., using maximum-ratio combining (MRC), also known as ratio-squared combining or predetection combining, except that the first and second soft information are from the same uplink transmission, as received at two different receivers, rather than from a transmission and retransmission of the data by the UE. The CPU again determines whether this decoding attempt was successful, as shown at block 630. If so, the APUs are instructed to clear their buffers for the uplink transmission (block 640) and the process ends.

In many cases where the CPU requests second soft information from the second best APU, the combining of the first and second soft information will produce a signal-to-noise-plus-distortion ratio (SNDR) that is high enough for a successful decoding of the uplink transmission. However, in some cases this second decoding attempt will also fail, e.g., when a momentary fade obscures the UE's signal at both the first and second best APUs. If this second attempt is unsuccessful, the steps shown at blocks 660, 630, and 650 may be repeated, either until the decoding is successful or until it is determined that there are no more APUs holding soft information that has not yet been sent to the CPU, or until the CPU determines that it has tried enough (e.g., after a predetermined number of attempts). At that point, the CPU may instruct the APUs to clear their buffers with respect to that uplink transmission, and may request the UE to retransmit the data that the CPU was unable to successfully decode. This is shown at block 670. Note that in some embodiments, each APU may automatically clear its buffer for a given uplink transmission after sending the respective data to the CPU; in that case, an explicit instruction from the CPU to flush the APUs may be unnecessary when the CPU has requested and received soft information from all of the APUs that demodulated and stored soft information.

It should be appreciated that the conditional merging of IQ data as described above will reduce the average needed information bandwidth in the serial links from APUs to the CPU. The system can still deliver a very high sensitivity by combining data from several APUs, when needed, while using data from only one APU when that is sufficient. The average power consumption of the system will be reduced, since soft bits are only sent when needed, e.g., when the signal from a UE to the closest APU is blocked or in a fading dip. In URLL (ultra-reliable, low latency) scenarios, the system can achieve better SNR and thus lower BER, and avoid time-consuming retransmissions from the UE. While buffering in the APUs is needed to support these techniques, the buffer size of each APU can be limited, since the stored data is scrapped after a successful decoding of the corresponding uplink transmission.

FIG. 7 is a process flow diagram illustrating an example method according to the techniques described above, as carried out by a controlling node of a distributed wireless system that comprises the controlling node and two or more antenna processing nodes communicatively coupled to the controlling node but spatially separated from each other and from the controlling node. Again, here the terms "controlling node" and "antenna processing nodes" are used interchangeably with the terms "CPU" and "APU," respectively.

The illustrated method includes, as shown at block 720, a step of receiving first soft bit information from a first one of the antenna processing nodes, where this first soft bit information corresponding to reception of a first wireless transmission from a wireless device at the first one of the antenna processing nodes. This first soft bit information may be received in response to a request for the first soft bit information previously sent by the controlling to the first one of the antenna processing nodes, in some embodiments, as shown in block 710. In some embodiments, the request is sent to the first one of the antenna processing nodes is in response to determining that the first one of the antenna processing nodes has a best estimated signal quality metric for the wireless device, such as a highest signal level, lowest pathloss, etc. In some other embodiments, the first soft bit information may be sent automatically by the first antenna processing node, e.g., when that antenna processing node has been previously informed that it is the "best" antenna processing node for the wireless device.

As shown at block 730, in response to a determination by the controlling node that it is unable to successfully decode transmitted bits from the first wireless transmission using the first soft bit information, the controlling node requests soft bit information from a second one of the antenna processing nodes. This request may be sent, for example, in response to determining that the second one of the antenna processing nodes has a next best estimated signal quality metric for the wireless device, compared to the first one of the antenna processing nodes.

As shown at block 740, the controlling node then receives second soft bit information from the second one of the antenna processing nodes, the second soft bit information corresponding to reception of the first wireless transmission from the wireless device at the second one of the antenna processing nodes. As shown at block 750, the controlling node decodes transmitted bits from the first wireless transmission using both the first soft bit information and the second soft bit information. This decoding may comprise performing maximal-ratio combining of the first soft bit information and the second soft bit information, for example. Note that as used here, "decode," "decodes," or "decoding" refer to an attempt to recover transmitted data from demodulated soft bit information, whether the attempt is successful or not, e.g., as determined by a cyclic redundancy check (CRC). A "successful" decoding is one in which the CRC or other error-checking or error-correction scheme indicates that the transmitted data has been correctly recovered.

In some embodiments or instances, then, the decoding step shown at block 750 may result in the controlling node determining, after receiving the second soft bit information, that the controlling node is unable to successfully decode the transmitted bits from the first wireless transmission using only the first soft bit information and the second soft bit information, and then requesting soft bit information from a third one of the antenna processing nodes, in response to said determining. Thus, the step shown at block 730 is repeated, for a third one of the antenna processing nodes. The controlling node then receives third soft bit information from the third one of the antenna processing nodes (as shown at block 740), the third soft bit information corresponding to reception of the first wireless transmission from the wireless device at the third one of the antenna processing nodes, and decodes the transmitted bits from the first wireless transmission (as shown at block 750) using the first soft bit information, the second soft bit information, and the third soft bit information. This may be repeated additional times, in some instances.

In some embodiments and/or instances, the method comprises the additional step of, after successfully decoding the transmitted bits from the first wireless transmission, signaling at least one of the two or more antenna processing nodes, this signaling indicating that soft bit information corresponding to reception of the first wireless transmission may be discarded. This is shown at block 760. In other embodiments and/or instances, the method comprises the additional step of, after failing to successfully decode the transmitted bits from the first wireless transmission using the received soft bit information, controlling one or more of the antenna processing nodes to send a request for retransmission to the wireless device. This is shown at block 770. In some embodiments and/or instances, controlling one or more of the antenna processing nodes to send the request for retransmission to the wireless device is in response to failing to successfully decode the transmitted bits from the first wireless transmission using received soft bit information from every one of the two or more antenna processing nodes. In other embodiments and/or instances, this controlling one or more of the antenna processing nodes to send the request for retransmission to the wireless device is in response to failing to successfully decode the transmitted bits from the first wireless transmission using received soft bit information from a predetermined maximum number of the two or more antenna processing nodes.

FIG. 8 is a process flow diagram illustrating a method, complementing that shown in FIG. 7, as carried out in an antenna processing node of a distributed wireless system that comprises a controlling node, the antenna processing node, and one or more additional antenna processing nodes. As in the previous examples, each of the antenna processing nodes is communicatively coupled to the controlling node but spatially separated from each other and from the controlling node.

The method shown in FIG. 8 begins with the antenna processing node receiving a first wireless transmission from a wireless device and storing first soft bit information corresponding to the first wireless transmission, as shown at block 810. It will be appreciated that the antenna process node may need to receive and store additional transmissions from the same or other wireless devices, in some embodiments, so the antenna processing node's buffer should be sized accordingly. In some embodiments or instances, then, the method shown in FIG. 8 may further include, for example, receiving a second wireless transmission from the wireless device, after receiving the first wireless transmission but before receiving a request for soft bit information corresponding to the first wireless transmission, and storing second soft bit information corresponding to this second wireless transmission.

As shown at block 820, the antenna processing node receives, from the controlling node, a request for soft bit information corresponding to the first wireless transmission, as shown at block 820. In response, to the request, the antenna processing node sends the first soft bit information to the controlling node, as shown at block 830.

As shown at block 840, the method further comprises discarding the stored first soft bit information after sending the first soft bit information to the controlling node. In some embodiments and/or instances, this is done automatically, after sending the first soft bit information to the controlling node. In others, this is done in response to receiving an indication from the controlling node that the antenna processing unit may discard the soft bit information. This may be an indication that decoding of the first wireless transmission was successful, in some instances and/or embodiments. In others, this indication may be a command to send a request for retransmission of the first wireless transmission to the wireless device.

Figure 9:
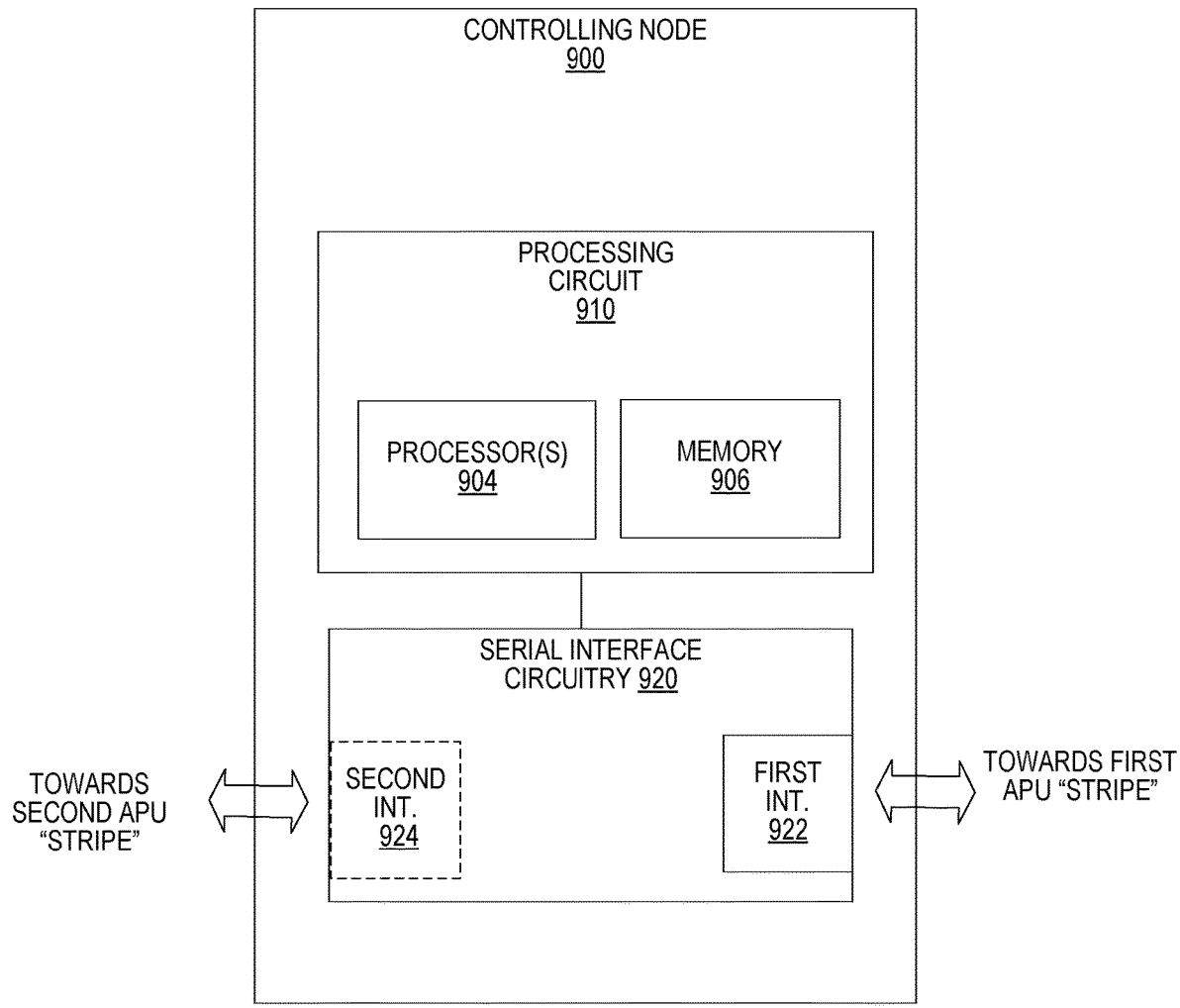
FIG. 9 is a block diagram of an example controlling node, according to some embodiments.

FIG. 9 is a block diagram illustrating an example controlling node apparatus 900, according to some embodiments. Controlling node apparatus 900, which may also be referred to as simply controlling node 900, includes a processing circuit 910, which in turn includes one or more processors 904, controllers, or the like, coupled to memory 906, which may comprise one or several types of memory, such as random-access memory, read-only memory, flash memory, etc. Stored in memory 906 may be computer program code for execution by processor(s) 904, including program code configured to cause the controlling node 900 to carry out any one or more of the techniques described herein, such as the methods discussed above in connection with FIG. 7.

Controlling node 900 further comprises serial interface circuitry 920 operatively coupled to the processing circuit 910. Serial interface circuitry 920 includes at least one serial interface 922 configured to transmit data to and receive data from one or several antenna processing nodes connected in series, via a serial link connected to the serial interface 922. In some embodiments, the serial interface circuitry 920 may comprise a second serial interface 924, configured to transmit data to and receive data from a second set of antenna processing nodes connected in series, via a serial link connected to the second serial interface 924. Thus, the controlling node 900 may be able to separately control two (or more) "stripes" or "chains" of antenna processing nodes, through respective serial interfaces.

While not shown in FIG. 9, in some embodiments the controlling node 900 may be collocated with or include an antenna processing node or comparable functionality, e.g., as shown in FIG. 4. From a functional standpoint, this collocated antenna processing node functionality may be treated in the same manner as other antenna processing nodes in a series.

Referring again to FIG. 4, this figure is a block diagram illustrating an example antenna processing node 400, according to some embodiments. Antenna processing node 400 includes radio circuitry 410 and antennas 415, processing circuit 420, and serial interface circuitry 430, which includes a first serial interface 432, facing "upstream" towards a controlling node, as well as a second serial interface 434, facing "downstream," towards one or more subsequent antenna processing nodes. It will be appreciated that when antenna processing node is the last antenna processing node in a chain, the second serial interface 434 may be unused.

Radio circuitry 410 includes receive (RX) and transmit (TX) functionality for communicating with one or more wireless devices via antennas 415. For downlink communications, i.e., radio communications to one or more wireless devices, the radio circuitry 410 includes TX circuitry 414 configured to receive baseband information relayed to the radio circuitry 410 from a controlling node, via the upstream serial interface 432 and the processing circuit 420. TX circuitry 414 includes upconverter circuits, power amplifier circuits, and filter circuits to convert this baseband information to radio frequency and condition it for transmission to one or more wireless devices. For uplink communications, i.e., radio communications from one or more wireless devices, the radio circuitry 410 includes RX circuitry 412 configured to receive wireless transmissions via antennas 415, amplify, filter, and downconvert the received transmissions, and sample the downconverted transmissions to obtain soft information corresponding to the received wireless transmission. This soft information may be in the form of I-Q samples, for instance, and may be interchangeably referred to as soft bits or soft bit information. The soft bit information is passed to processing circuit 420, for processing and storing/buffering as described herein.

Processing circuit 420 includes one or more processors 424, controllers, or the like, coupled to memory 426, which may comprise one or several types of memory, such as random-access memory, read-only memory, flash memory, etc. Stored in memory 426 may be computer program code for execution by processor(s) 424, including program code configured to control the radio circuitry 410 and serial interface circuitry 430 and to cause the antenna processing node 400 to carry out any one or more of the techniques described herein, such as the methods discussed above in connection with FIG. 8. Memory 426 is also used to store/buffer soft bit information from wireless transmission, according to the techniques described above.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a controlling node of a distributed wireless system that comprises the controlling node and two or more antenna processing nodes communicatively coupled to the controlling node but spatially separated from each other and from the controlling node, the method comprising:

receiving first soft bit information from a first one of the antenna processing nodes, the first soft bit information corresponding to reception of a first wireless transmission from a wireless device at the first one of the antenna processing nodes;

responsive to a determination that the controlling node is unable to successfully decode transmitted bits from the first wireless transmission using the first soft bit information, requesting soft bit information from a second one of the antenna processing nodes;

receiving second soft bit information from the second one of the antenna processing nodes, the second soft bit information corresponding to reception of the first wireless transmission from the wireless device at the second one of the antenna processing nodes; and decoding transmitted bits from the first wireless transmission using both the first soft bit information and the second soft bit information.

2. The method of claim 1, further comprising:

determining, after receiving the second soft bit information, that the controlling node is unable to successfully decode the transmitted bits from the first wireless transmission using only the first soft bit information and the second soft bit information;

requesting soft bit information from a third one of the antenna processing nodes, in response to said determining; and receiving third soft bit information from the third one of the antenna processing nodes, the third soft bit information corresponding to reception of the first wireless transmission from the wireless device at the third one of the antenna processing nodes;

wherein decoding the transmitted bits from the first wireless transmission using both the first soft bit information and the second soft bit information further comprises using the third soft bit information.

3. The method of claim 1, wherein decoding the transmitted bits from the first wireless transmission using both the first soft bit information and the second soft bit information comprises performing maximal-ratio combining of the first soft bit information and the second soft bit information.

4. The method of claim 1, wherein the method further comprises:

after successfully decoding the transmitted bits from the first wireless transmission, signaling at least one of the two or more antenna processing nodes, said signaling indicating that soft bit information corresponding to reception of the first wireless transmission may be discarded.

5. The method of claim 1, wherein the method further comprises:

after failing to successfully decode the transmitted bits from the first wireless transmission using the received soft bit information, controlling one or more of the antenna processing nodes to send a request for retransmission to the wireless device.

6. The method of claim 5, wherein controlling one or more of the antenna processing nodes to send the request for retransmission to the wireless device is in response to either:

failing to successfully decode the transmitted bits from the first wireless transmission using received soft bit information from every one of the two or more antenna processing nodes; or failing to successfully decode the transmitted bits from the first wireless transmission using received soft bit information from a predetermined maximum number of the two or more antenna processing nodes.

7. The method of claim 1, wherein receiving the first soft bit information from the first one of the antenna processing nodes is in response to a request for the first soft bit information sent to the first one of the antenna processing nodes, the method comprising sending the request in response to determining that the first one of the antenna processing nodes has a best estimated signal quality metric for the wireless device.

8. The method of claim 7, wherein requesting soft bit information from the second one of the antenna processing nodes is in response to determining that the second one of the antenna processing nodes has a next best estimated signal quality metric for the wireless device.

9. A method, in an antenna processing node of a distributed wireless system that comprises a controlling node, the antenna processing node, and one or more additional antenna processing nodes, each of the antenna processing nodes being communicatively coupled to the controlling node but spatially separated from each other and from the controlling node, the method comprising:

receiving a first wireless transmission from a wireless device and storing first soft bit information corresponding to the first wireless transmission;

receiving, from the controlling node, a request for soft bit information corresponding to the first wireless transmission; and sending the first soft bit information to the controlling node, in response to the request.

10. The method of claim 9, further comprising discarding the stored first soft bit information after sending the first soft bit information to the controlling node.

11. The method of claim 9, wherein the method further comprises:

receiving a second wireless transmission from the wireless device, after receiving the first wireless transmission but before receiving the request for soft bit information corresponding to the first wireless transmission; and storing second soft bit information corresponding to the second wireless transmission.

12. The method of claim 9, the method further comprising:

receiving, from the controlling node, an indication that soft bit information corresponding to the first wireless transmission may be discarded; and discarding the stored first soft bit information, in response to the indication.

13. The method of claim 12, wherein the indication is an indication that decoding of the first wireless transmission was successful or a command to send a request for retransmission of the first wireless transmission to the wireless device.

14. A controlling node apparatus for use in a distributed wireless system that comprises the controlling node and two or more antenna processing nodes communicatively coupled to the controlling node but spatially separated from each other and from the controlling node, the controlling node apparatus comprising:

serial interface circuitry configured to send data to and receive data from the antenna processing nodes; and a processing circuit operatively coupled to the serial interface circuitry and configured to:

receive first soft bit information from a first one of the antenna processing nodes, via the serial interface circuitry, the first soft bit information corresponding to reception of a first wireless transmission from a wireless device at the first one of the antenna processing nodes;

responsive to a determination that the controlling node is unable to successfully decode transmitted bits from the first wireless transmission using the first soft bit information, request soft bit information from a second one of the antenna processing nodes, via the serial interface circuitry;

receive second soft bit information from the second one of the antenna processing nodes, via the serial interface circuitry, the second soft bit information corresponding to reception of the first wireless transmission from the wireless device at the second one of the antenna processing nodes; and decode transmitted bits from the first wireless transmission using both the first soft bit information and the second soft bit information.

15. The controlling node apparatus of claim 14, wherein the processing circuit is further configured to:

determine, after receiving the second soft bit information, that the controlling node is unable to successfully decode the transmitted bits from the first wireless transmission using only the first soft bit information and the second soft bit information;

request soft bit information from a third one of the antenna processing nodes, via the serial interface circuitry, in response to said determining; and receive third soft bit information from the third one of the antenna processing nodes, via the serial interface circuitry, the third soft bit information corresponding to reception of the first wireless transmission from the wireless device at the third one of the antenna processing nodes;

wherein the processing circuit is configured to decode the transmitted bits from the first wireless transmission using the first soft bit information, the second soft bit information, and the third soft bit information.

16. The controlling node apparatus of claim 14, wherein the processing circuit is configured to decode the transmitted bits from the first wireless transmission using both the first soft bit information and the second soft bit information by performing maximal-ratio combining of the first soft bit information and the second soft bit information.

17. The controlling node apparatus of claim 14, wherein the processing circuit is further configured to:

after successfully decoding the transmitted bits from the first wireless transmission, signal at least one of the two or more antenna processing nodes, said signaling indicating that soft bit information corresponding to reception of the first wireless transmission may be discarded.

18. The controlling node apparatus of claim 14, wherein the processing circuit is configured to:

after failing to successfully decode the transmitted bits from the first wireless transmission using the received soft bit information, control one or more of the antenna processing nodes to send a request for retransmission to the wireless device.

19. The controlling node apparatus of claim 18, wherein the processing circuit is configured to control one or more of the antenna processing nodes to send the request for retransmission to the wireless device in response to one of:

failing to successfully decode the transmitted bits from the first wireless transmission using received soft bit information from every one of the two or more antenna processing nodes; and failing to successfully decode the transmitted bits from the first wireless transmission using received soft bit information from a predetermined maximum number of the two or more antenna processing nodes.

20. An antenna processing node, for use in a distributed wireless system that comprises a controlling node, the antenna processing node, and one or more additional antenna processing nodes, each of the antenna processing nodes being communicatively coupled to the controlling node but spatially separated from each other and from the controlling node, wherein the antenna processing node comprises:

radio circuitry configured to communicate wirelessly with one or more wireless devices;

serial interface circuitry configured to communicate over a serial link with the controlling node; and a processing circuit operatively coupled to the serial interface circuitry and configured to:

receive a first wireless transmission from a wireless device, via the radio circuitry, and storing first soft bit information corresponding to the first wireless transmission;

receive from the controlling node, via the serial interface circuitry, a request for soft bit information corresponding to the first wireless transmission; and send the first soft bit information to the controlling node, via the serial interface circuitry, in response to the request.

\* \* \* \* \*